US005515447A

United States Patent [19]
Zheng et al.

[11] Patent Number: 5,515,447
[45] Date of Patent: May 7, 1996

[54] METHOD AND APPARATUS FOR LOCATING AN ACQUISITION TARGET IN TWO-DIMENSIONAL IMAGES BY DETECTING SYMMETRY IN TWO DIFFERENT DIRECTIONS

[75] Inventors: Joe Zheng, Brookfield; Ming Lei, Danbury, both of Conn.

[73] Assignee: United Parcel Service of America, Inc., Atlanta, Ga.

[21] Appl. No.: 254,976

[22] Filed: Jun. 7, 1994

[51] Int. Cl.[6] .................................................. G06K 9/00
[52] U.S. Cl. .......................... 382/100; 382/203; 382/287; 235/494
[58] Field of Search ............................... 382/1, 22, 25, 382/26, 48, 100, 101, 103, 199, 203, 204, 287, 291; 348/94; 209/583, 584; 235/461, 464, 470, 494

[56] References Cited

U.S. PATENT DOCUMENTS

| | | | |
|---|---|---|---|
| 3,632,995 | 1/1972 | Wilson | 235/61.12 N |
| 3,801,775 | 4/1974 | Acker | 235/61.11 E |
| 4,424,588 | 1/1984 | Satoh et al. | 382/48 |
| 4,695,991 | 9/1987 | Hudson | 369/44 |
| 4,696,049 | 9/1987 | Musso | 382/22 |
| 4,718,103 | 1/1988 | Shojima et al. | 382/13 |
| 4,736,109 | 4/1988 | Dvorzsak | 250/566 |
| 4,745,269 | 5/1988 | Van Gils | 235/487 |
| 4,776,464 | 10/1988 | Miller et al. | 209/3.3 |
| 4,874,936 | 10/1989 | Chandler et al. | 235/494 |
| 4,896,029 | 1/1990 | Chandler et al. | 235/494 |
| 4,924,078 | 5/1990 | Sant'Anselmo et al. | 235/494 |
| 4,933,865 | 6/1990 | Yamamoto et al. | 364/518 |
| 4,947,383 | 8/1990 | Hudson | 369/44.11 |
| 4,955,062 | 9/1990 | Terui | 382/8 |
| 5,103,489 | 4/1992 | Miette | 382/48 |
| 5,153,418 | 10/1992 | Batterman et al. | 235/494 |
| 5,153,928 | 10/1992 | Iizuka | 382/65 |
| 5,155,343 | 10/1992 | Chandler et al. | 235/462 |
| 5,189,292 | 2/1993 | Batterman et al. | 235/494 |
| 5,189,711 | 2/1993 | Weiss et al. | 382/25 |
| 5,191,621 | 3/1993 | Brok | 382/1 |
| 5,229,591 | 7/1993 | Heiman et al. | 235/472 |
| 5,241,166 | 8/1993 | Chandler | 235/494 |
| 5,276,315 | 1/1994 | Surka | 235/462 |
| 5,291,564 | 3/1994 | Shah et al. | 382/48 |
| 5,327,171 | 7/1994 | Smith et al. | 348/223 |
| 5,329,105 | 7/1994 | Klancnik et al. | 235/463 |

FOREIGN PATENT DOCUMENTS

| | | | |
|---|---|---|---|
| WO86/05906 | 10/1986 | WIPO | G06K 19/06 |
| 94/20925 | 9/1994 | WIPO | 382/48 |

Primary Examiner—Leo H. Boudreau
Assistant Examiner—Andrew W. Johns
Attorney, Agent, or Firm—Jones & Askew

[57] ABSTRACT

A system and method are disclosed for locating an acquisition target consisting of a plurality of concentric rings of alternating levels of reflectivity (bull's-eye pattern) in two-dimensional images such as optically encoded symbologies. Such targets may be found even if they vary in size and tilt angle with respect to an imaging camera. Symmetry characteristics of the targets are used to locate the targets independent of the threshold level selected for determining transitions between rings of different reflectivity.

29 Claims, 4 Drawing Sheets

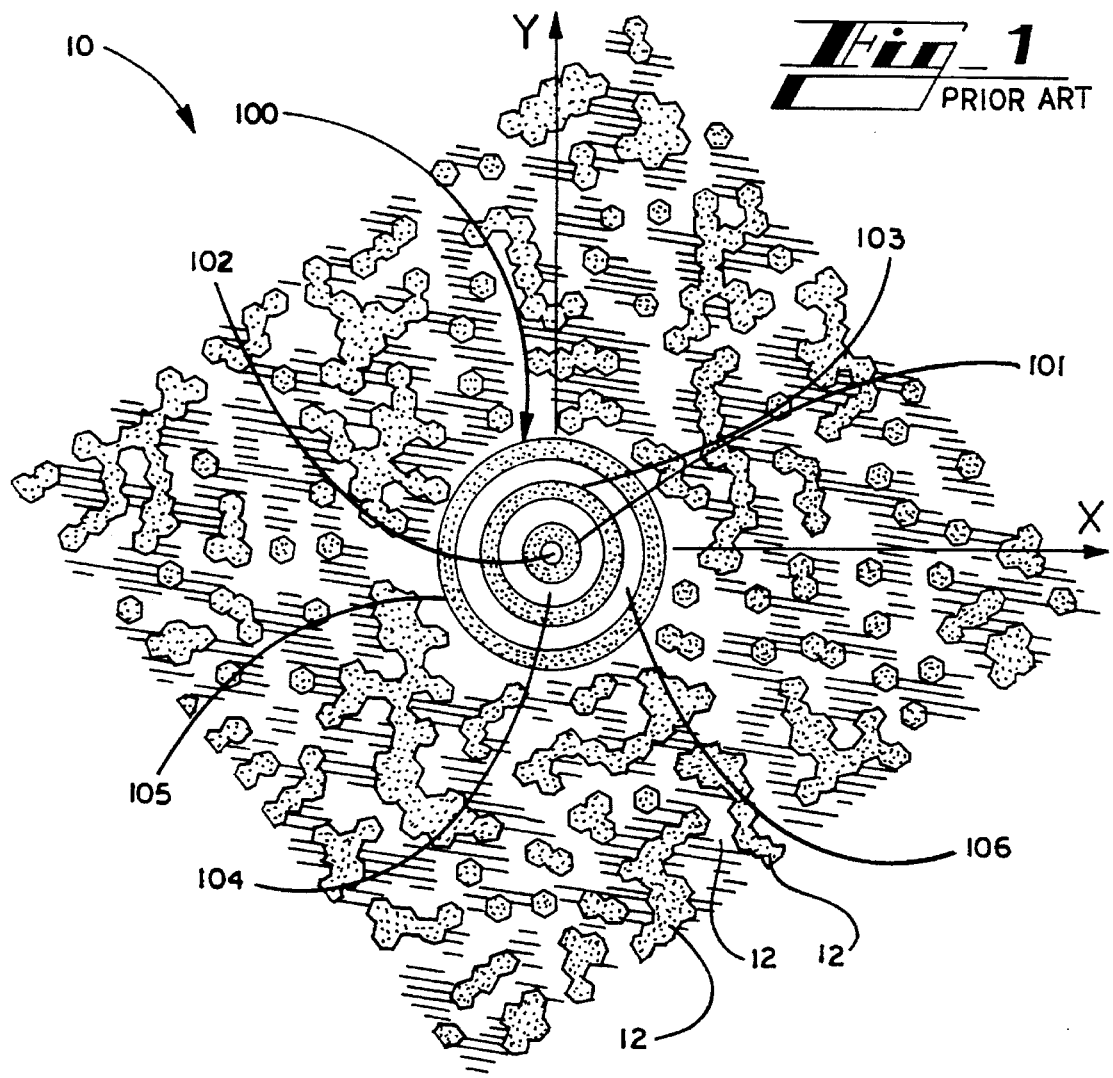
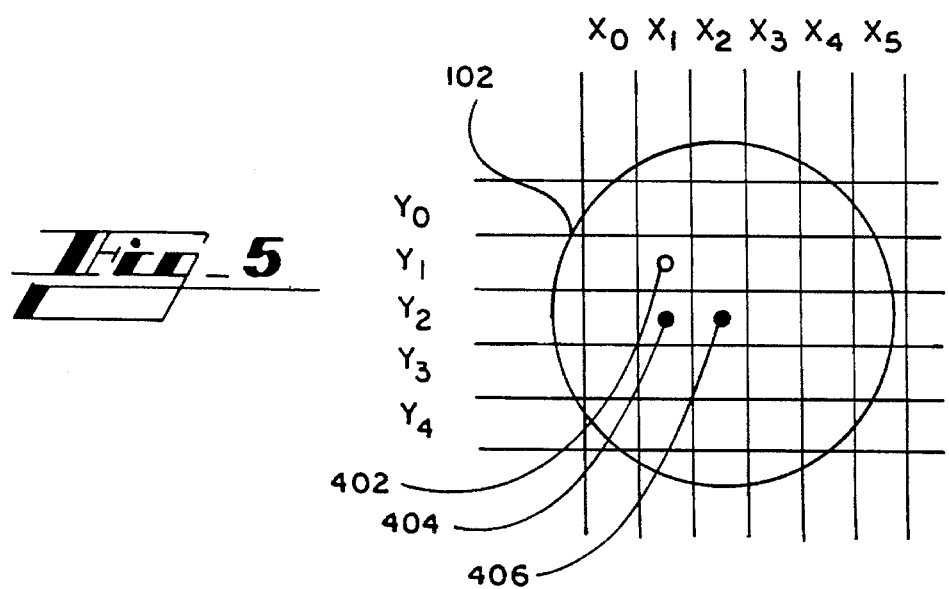

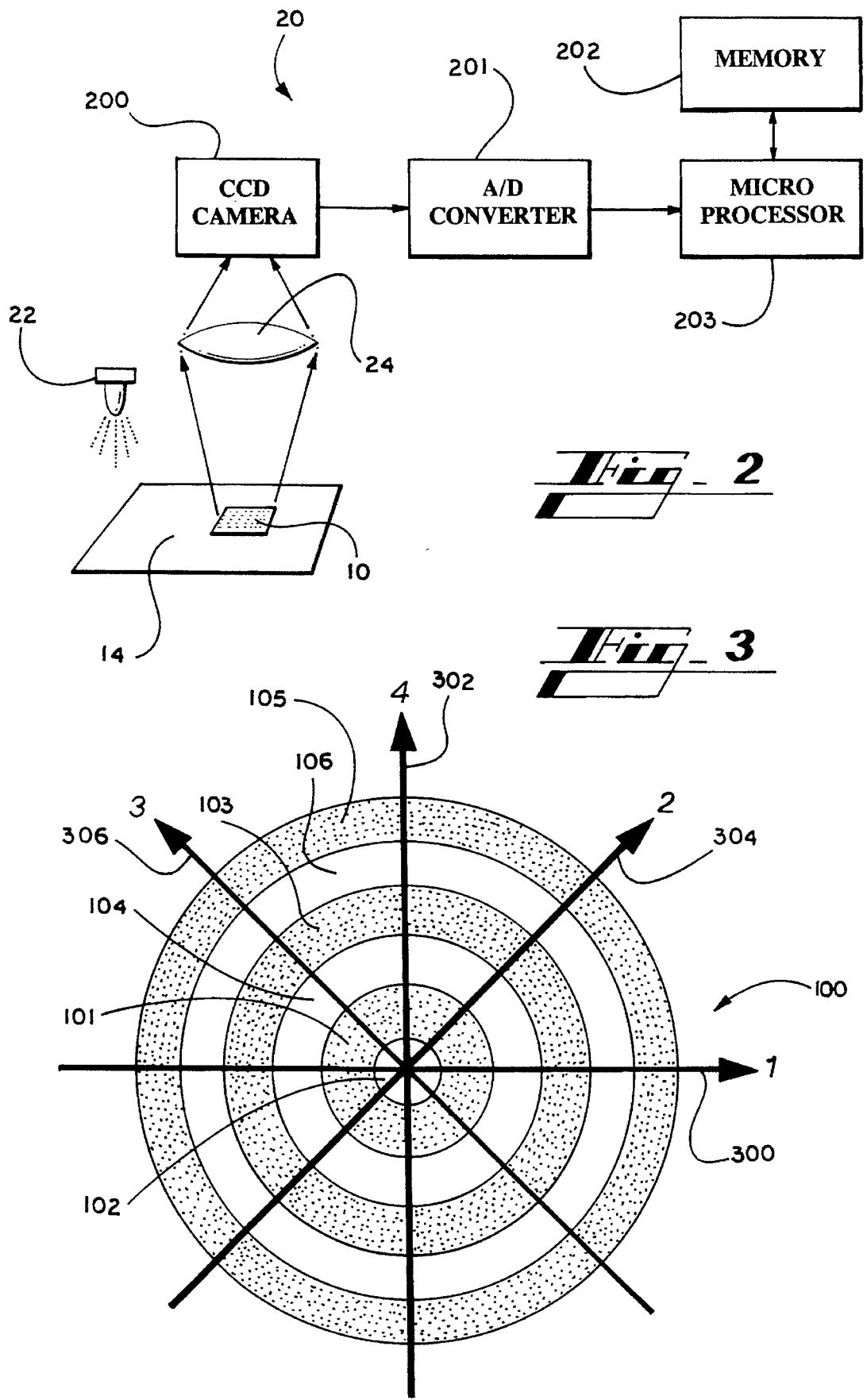

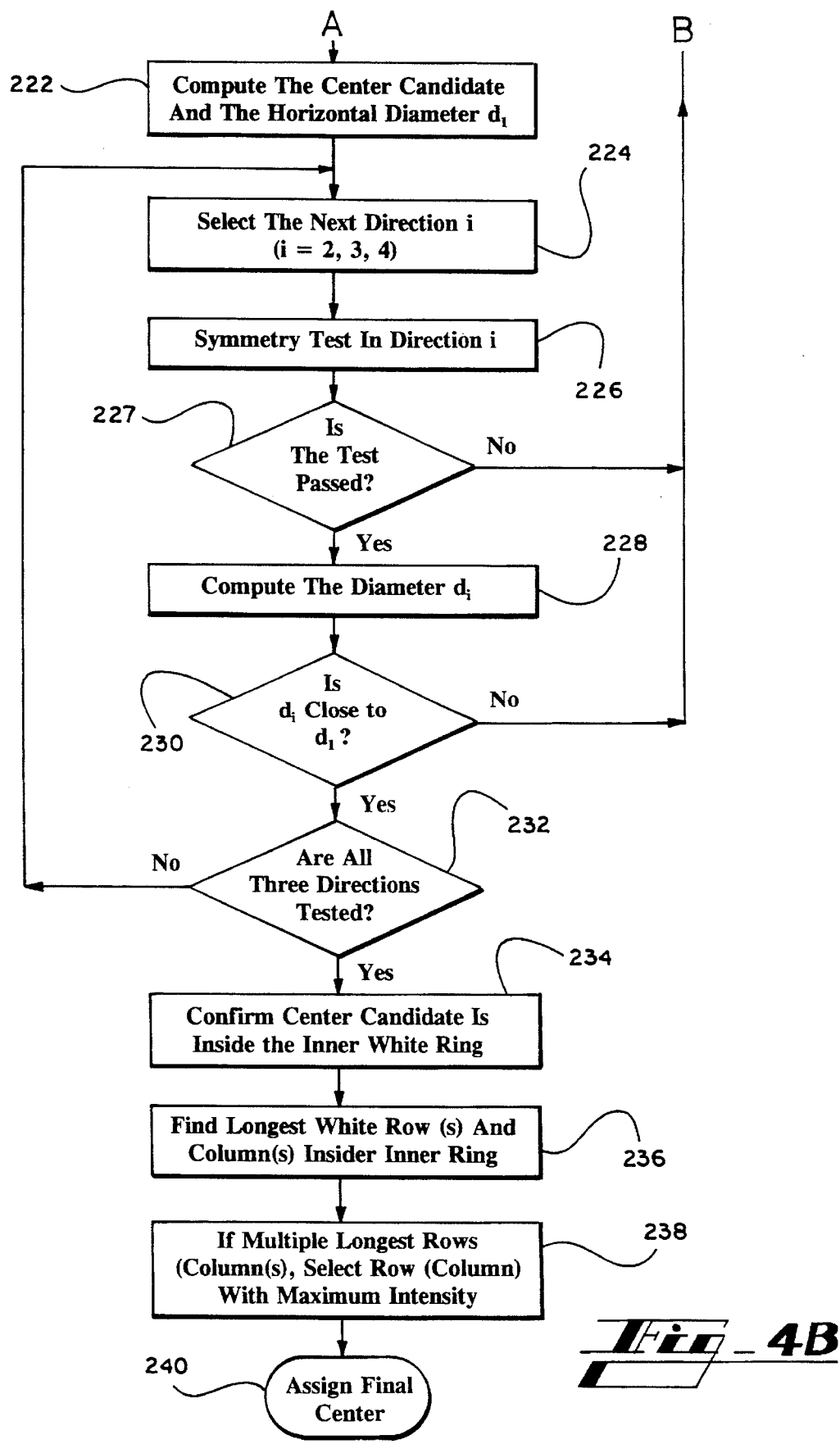

METHOD AND APPARATUS FOR LOCATING AN ACQUISITION TARGET IN TWO-DIMENSIONAL IMAGES BY DETECTING SYMMETRY IN TWO DIFFERENT DIRECTIONS

TECHNICAL FIELD

The present invention relates to optically encoded symbologies, and more particularly relates to locating an acquisition target consisting of a plurality of concentric rings of alternating levels of reflectivity and more specifically to a method and apparatus for locating such target of varying size and varying angle in two-dimensional images.

BACKGROUND ART

For years, the bar code has been promoted as a machine-readable symbology. A bar code is a one-dimensional symbol that contains a unique serial number encoded in black and white bars. Bar codes are widely used as indices to associate physical objects with larger databases containing more detailed information. Thus, the bar code itself often provides no useful information beyond, for example, a zip code.

As the demand for information-based technologies grows, there is considerable interest in eliminating the associated database and storing more data information in the symbology itself. With current technology, encoding additional information makes a one-dimensional bar code unrealistically long. A number of two-dimensional symbologies, either in the form of a stacked bar code or a matrix type, have been introduced to accommodate this need. One of them, the MaxiCode symbology, is described in U.S. Pat. Nos. 4,874,936 and 4,896,029.

Two-dimensional symbologies such as the MaxiCode cannot be acquired and decoded by the laser spot scanners typically used to scan single line bar codes. Attempts have been made to modify such devices to perform raster scanning operations on stacked bar codes and two-dimensional codes. However, this approach is too lengthy for practical high speed applications. A faster method is to acquire an image of the entire two-dimensional symbology using an electronic camera. Charge-coupled device (CCD) sensor arrays of the type used in video cameras are suitable. They consist of a matrix of "pixels" each of which stores a cumulative charge according to the amount of light which strikes the pixel. The pixel values are read out, converted and stored in a corresponding matrix in a digital memory for evaluation and processing.

An important use for optically encoded, machine-readable symbologies has been on labels attached to packages, letters, baggage, containers and the like. While in the case of bar codes, the information carried on the label may be only a key to a remote database, or possibly a zip code, two-dimensional symbologies are database independent and can carry information pertaining to full destination address, origin, nature of the contents, routing, sorting, tracking, and the like. The symbology reader must be able to evaluate an image taken within a wide range of orientations relative to the reader camera, because it is difficult and impractical to precisely align the symbology with the CCD detector. Typically, therefore, the rows of optical elements of the symbology will not be aligned in the image with the rows of pixels forming the CCD.

As a result, the reader must be able to recognize the presence of a symbology, determine its location in the image, and determine its orientation before attempting to decode the encoded information. Acquisition targets have been long used for automatic aiming in the area of computer and robotic vision systems. There are many forms of acquisition targets such as round circle, cross sign and bar. An example of a label acquisition symbol is described in U.S. Pat. No. 4,776,464. The type of target consisting of concentric rings is the most preferable because of its unique feature of being omnidirectionally symmetric along the center. Placing such a target on objects being searched makes it possible to locate the objects in real time by a sensing mechanism.

As disclosed in U.S. Pat. Nos. 4,874,936 and 4,896,029, the MaxiCode symbology contains a set of concentric rings or bull's-eye at the center of the symbology. This acquisition target of alternating levels of black and white is embedded to facilitate an imaging and decoding device to locate the label instantly in an unconstructed environment. The advantage of using such an acquisition target becomes apparent when labels to be located are affixed on the surface of objects on a fast moving conveyer belt, and must be read and decoded by an overhead decoding system for routing and sorting purposes.

U.S. Pat. Nos. 4,874,936 and 4,896,029 disclose analog and digital methods for locating the bull's-eye acquisition target. All known methods converge to one principle, namely having a template for comparison measurement. As described fully in the '936 and '029 patents, a template of the ring structure is used to move around the image data comprising the acquisition target 100. The matching or locating process is done when the data difference between the template and the image data underlying the template reaches a minimum error. As the size of the acquisition target 100 or image resolution changes, with a fixed template, it is unlikely that the location with the minimum error still indicates the presence of the acquisition target 100. Furthermore, there may be many locations with similar minimum errors indicating many false targets. Similar erroneous results may be obtained when the imaged acquisition target possesses tilt angle distortion.

Furthermore, it has been shown that tremendous computational power is required for direct implementation. Different computational methods have been proposed to reduce the computational complexity. For example, a run length coding technique may be applied to transfer the original grey label image into a coded image through a thresholding process. The image is then compared with a similarly encoded template pattern. While the improved method is able to reduce the computational time significantly, it fails to find the target when a label image is modestly distorted or its resolution varies slightly. Also, the incorrect choice of threshold value for color transitions in the image may alter the width of rings of the acquisition target, so that the comparison measurement can not be reliably performed.

To account for variations in the size of the image due to variations in the distance from the object to the CCD detector, and distortion caused by the imaging angle, multiple patterns of different sizes or distortion factors may have to be stored as different templates. Since the size of a label image is not predefined, each template has to be tried successively in order to locate the target. This is impractical in reality due to the processing time involved.

Thus, this method of bull's-eye detection using matching comparisons, has several disadvantages. A match to the template may be produced by a coincidental arrangement of data cells within the symbology, and therefore may not necessarily indicate the location of the bull's-eye. Further, any change in the size of the image affects the measured frequency. The image size may vary not only as a result of printing different sizes, but also as a result of varying distances between the symbology and the camera. For example, it is difficult to require that a (noncontact) hand held reader be held at the same fixed distance to all the packages. As noted, multiple templates must be compared to the image to account for size variations, adding complexity and time to the procedure, and increasing the possibility of a false "find." Problems in matching the template frequency can also arise from tilting the camera and label relative to one another, which results in a distorted image. This distortion changes the frequency of the stored image, as compared to that of an undistorted template.

Finally, the accuracy of matching the frequency increases with the number of concentric rings, but this may increase the area of the symbology devoted to the bull's-eye and decrease the area available to carry information.

There is a great need for a new system which is able to overcome the described problems. There has further been a need in the art for a system of reduced computational complexity for locating two-dimensional acquisition targets, which at the same time is more efficient and more reliable. There also has been a need for such a system that can efficiently locate an acquisition target regardless of its size.

SUMMARY OF THE INVENTION

The present invention has been made in consideration of the above described problems. The present invention provides an improved system for locating acquisition targets including those found in two-dimensional optically encoded symbologies, and addresses the problems described above by taking advantage of symmetry characteristics of the symbologies to locate such targets more quickly and efficiently.

According to one aspect of the invention, a two-dimensional acquisition target is located by finding its key element, a geometrically symmetric, bounded element of a first reflectivity surrounded by a geometrically symmetric border area of a second reflectivity. Generally described, the system and method locate the key element by scanning the stored image along a scanning direction, detecting a candidate bounded element and associated border area demonstrating symmetry along the scanning direction, and determining whether the candidate bounded element and associated border area are symmetric along a second direction.

One example of a symbology including a key element within an acquisition target is the MaxiCode, in which the center white spot of the bull's-eye (also referred to herein as the inner light ring) forms a key element surrounded by a border area of a first dark ring. Also surrounding these elements are two additional white and two additional dark concentric rings, the symmetry of which may be utilized according to a preferred embodiment of the invention to more accurately and efficiently locate the key element. It will be understood that the number of concentric tings may be varied.

The symmetry of this type of acquisition target is independent of its size, so that the location technique of the invention can be used regardless of the size of the symbology within which the acquisition target may be found. Also, the technique is insensitive to variations in lighting conditions and distortion due to imaging angle. Furthermore, the size of the target can be determined and used to infer the size of the symbology.

The present invention avoids the template matching principle. The system does not synthesize any templates to account for different situations and the testing process is performed within the given data instead of against a template. Location of the target is based on the symmetric property of the acquisition target. The advantage of using symmetry tests is that they are invariant to distortion of the image of the acquisition target due to a tilt angle between the target and the sensing mechanism since the symmetric characteristic of the acquisition target is preserved in the distorted image.

In a preferred embodiment of the invention the system and method use a two-step approach. The first step only aims to locate the inner light ring in a fast and robust manner, independent of the tilt angle of the target. The second step aims to accurately locate the center of the inner ring.

The system and method of the present invention can be applied to key elements and associated border elements which have at least two axes of symmetry, such as polygonal "bull's-eyes." For example, the image of an acquisition target defined by alternating light and dark square bands may be scanned in all orientations until symmetry along two axes is found. Using an acquisition target that is omni-directionally symmetric is much more efficient, however, because the presence of the target's symmetry along one axis will always be discoverable by scanning in a single direction. Scanning to check symmetry in a second direction then need only be done along a line through the center of the candidate target. The first scanning direction may conveniently be along the rows of the CCD detector.

Therefore, an important object of the present invention is to provide a generic solution to the situation in which an imaged acquisition target varies in size or possesses tilt angle.

It is a further object of the present invention to provide an improved method and system for locating two-dimensional symbologies.

It is a further object of the present invention to provide an improved system for locating an acquisition target in a digital image.

It is a still further object of the present invention to provide an improved system for locating such acquisition target which is simple in operation.

It is still another object of the present invention to provide an improved system for locating such acquisition target which is efficient in operation.

It is still another object of the present invention to provide an improved system for locating such acquisition target which is efficient in computation.

It is still another object of the present invention to provide an improved system for locating such acquisition target which has fast computational capabilities.

It is still another object of the present invention to provide an improved system for locating such acquisition target which needs no additional memory for storing many synthetic templates.

It is still another object of the present invention to provide an improved system for locating such acquisition target which is cost-effective in hardware implementation.

It is a further object of the present invention to provide a method and system for locating two-dimensional symbologies that is insensitive to variations in lighting conditions and distortion due to imaging angle.

It is a further object of the present invention to provide a method and system for determining the size of two-dimensional acquisition targets and symbologies.

Other objects, features and advantages of the present invention will become apparent upon examining the following description of preferred embodiments of the invention, when taken in conjunction with the drawings and the appended claims.

BRIEF DESCRIPTION OF THE DRAWINGS

FIG. 1 is a plan view of a prior art two-dimensional symbology including an acquisition target consisting of a symmetrical key element and surrounding symmetrical border elements of alternating levels of reflectivity.

FIG. 2 is a block diagram of a system for imaging a two-dimensional acquisition target or symbology, in which the processor is configured according to the present invention.

FIG. 3 shows the axes used to test the symmetric features of the acquisition target in the preferred embodiment of the invention.

FIGS. 4A and 4B show a system flowchart outlining the steps of the technique of the present invention for locating an acquisition target.

FIG. 5 shows diagrammatically a fine-tuning procedure for determining the center of a key element.

DETAILED DESCRIPTION OF THE INVENTION

Figure 4A:
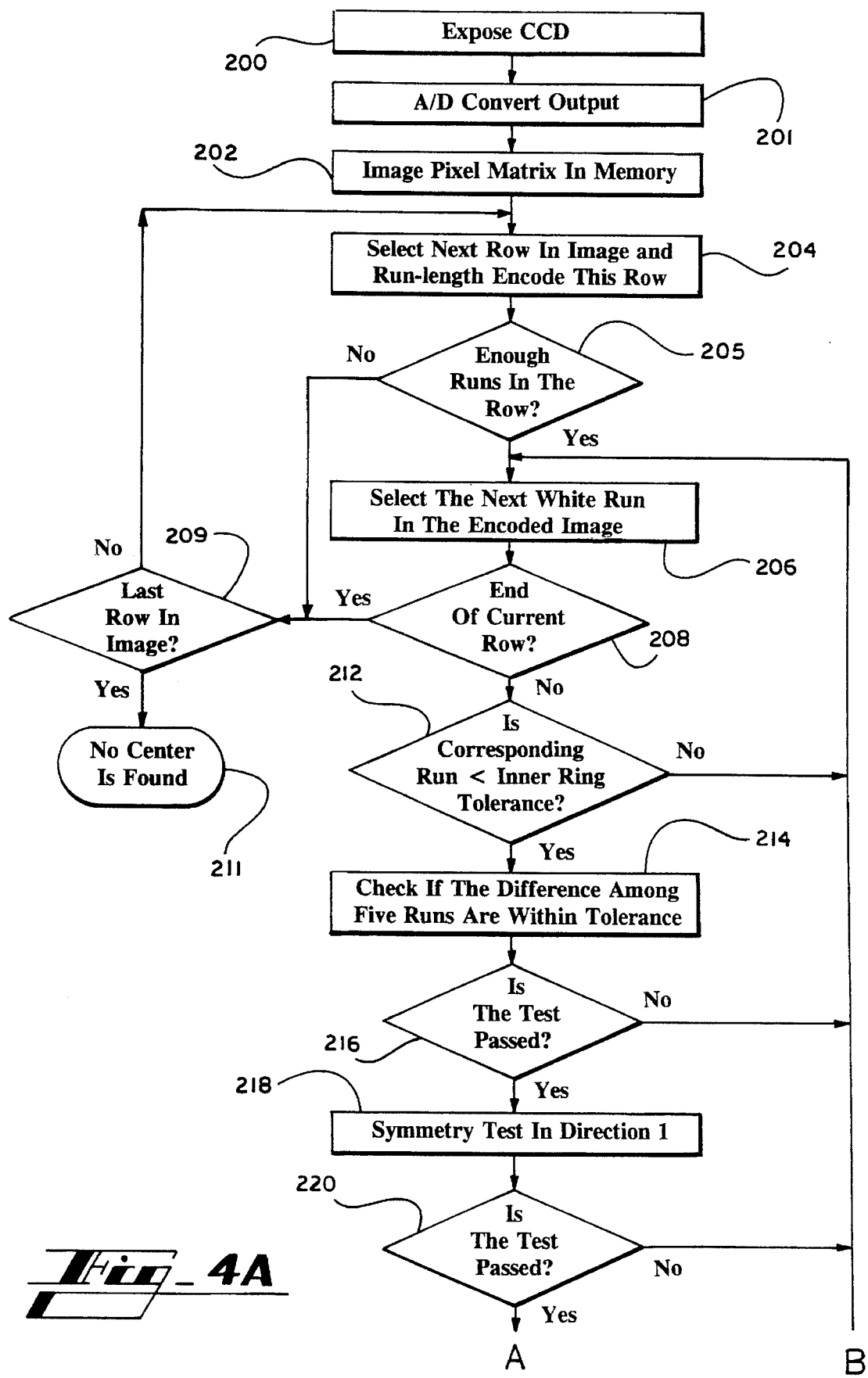

Referring now to the drawings, in which like numerals refer to like parts throughout the several views, FIG. 1 shows a prior art two-dimensional symbology 10, known as Maxi-Code, which may be positioned on a label, package or the like. This symbology includes a matrix of hexagonal information encoding elements 12 arranged in a square, and, at its center, an acquisition target 100 consisting of six concentric rings of alternating light and dark reflectivity. Of the six rings, there are three dark rings 101, 103 and 105 and three light rings 102, 104 and 106. The inner light core 102 is considered one of the three light concentric rings. The inner core 102 provides a key element and the other rings provide border elements, all of which can be used to locate the target in a manner described below.

The acquisition target 100 may be optically sensed in a well-known manner by a sensing mechanism 20, of the type shown in FIG. 2. The sensing mechanism 20 includes a CCD (charge-coupled device) video camera 200, such as a Pulnix 7-CN manufactured by Pulnix America, Inc. of Sunnyvale, Calif. 94086. The target is illuminated by a light source, such as one or more LEDs 22, and the reflected light from the symbology 10 on the label 14 is focused by optics 24 onto the detector of the camera 200. Such a camera includes a matrix of pixels which form an image by providing an output signal related to the amount of light falling on the pixel. These output signals are conventionally read out to an analog-to-digital converter 201 and, following an analog-to-digital conversion, are used to derive an array of image data generated and stored in a computer memory 202 under control of a microprocessor 203.

The present invention is preferably implemented in software in C language running on a Powergrabber processor marketed by Dipix Technologies of Canada, having a digital signal processing (DSP) chip therein, such as a TMSC30 designed and manufactured by Texas Instruments, Inc. of Houston, Tex.

To access any pixel in the computer memory 202, two parameters, x representing column and y representing row, that is, coordinates (x, y), are used as an address to a pixel. Therefore, the digitized video signal can be viewed as a two-dimensional image. The x axis as shown in FIG. 1 is parallel to the rows of pixels of the CCD detector of the camera, but the camera may capture the symbology 10 at any angle relative to the x axis. Also, the camera may be tilted relative to the plane of the symbology, causing some distortion of the image.

In the stored multiple-row image, data representing the light rings have high numerical values due to the high reflectivity of the light rings and those data representing the dark rings have low numerical values due to the low reflectivity of the dark rings. The process of obtaining such image data in computer memory is described in U.S. Pat. Nos. 4,874,936 and 4,896,029, which are incorporated herein by reference.

According to the present invention, the location of an acquisition target is not done by matching a synthetic template. Instead, the location process is carried out within the image data itself by using the symmetric property of the acquisition target. FIG. 3 shows the same acquisition target 100 with four axes separated by 45 degree angles. An axis 300 points to the East or in horizontal direction, an axis 302 points to the North or in vertical direction, and axes 304 and 306 point to the Northeast and Northwest, respectively. Axis 300 is the same as the x axis shown in FIG. 1, and is defined as being parallel to the rows of pixels. In the preferred embodiment shown, the acquisition target is symmetric about any one of these axes. In fact, the symmetry is not limited to these axes in the preferred acquisition target, whose concentric circular rings are omni-directionally symmetric. Of course, references to direction herein, such as "North", or "vertical", are used only to provide a relative frame of reference.

Referring now to FIGS. 4A and 4B, the process for locating the center of the acquisition target is shown diagrammatically with reference to corresponding processing devices. Additionally, to provide information for possible estimation of image resolution, the diameter of the target is obtained. The video camera 200 acts as a sensing mechanism to acquire image data in the form of an analog video signal. The A/D converter 201 converts the analog signal to digital representation in terms of image pixel values that are stored in computer memory 202.

The processor 203 may be programmed by a person of ordinary skill to carry out the following operations on the image data stored in the memory 202. In block 204 a starting row number in the image is selected. Thus, a row of pixel values is being addressed. A threshold for distinguishing white pixels from black pixels is determined from the set of values for the current row. The threshold is used to find transitions between black and white areas of the stored image. There are many methods of determining the threshold known to those in the art, such as the histogram method described in U.S. Pat. No. 4,874,936. Preferably, a middle value computed as $\frac{1}{2}(P_{max}+P_{min})$ is selected as the threshold, where $P_{max}$ and $P_{min}$ are the maximum and minimum pixel values in the current row. Alternately, a threshold may be calculated in the same way for the entire image, but providing a separate threshold for each row is preferred.

Based on the calculated threshold, the data can be run-length encoded. The following is an example:

BBBBBBBWWWWWWWWBBBWWWW-
WBBBBBWWWWBBBBBWWWW

Those pixel values under the threshold are labeled by letter B (i.e., Black) and those over the threshold are labeled by letter W (i.e., White). The corresponding run-length encoded sequence is given by:

78355454.

The numerical value representing the number of contiguous occurrences of the same letter in the immediate group is called a "run". The total number of runs in the example is 8. Note that the coding is always started with the first black pixel in the scanning direction. Thus, if one indexes the coded sequence by 1, 2, 3, ..., then the runs indexed by even numbers stand for white runs.

To detect numerically the possibility that a row passing through the center of the acquisition target has currently been encoded, the number of runs is compared with the number of rings at block 205. Along the axis 300 of the target 100, which crosses the five bordering rings 101, 103, 104, 105, 106 twice and the center ring 102 once, there are at least 12 "W to B" or "B to W" transitions. Thus, for a row going through the center white ring 102 of the given target 100, the number of runs must be greater than 13. If the number of runs is less than a predefined number (preferably 13), there is no need to further test for symmetry of the target 100 along this row. In this case the program proceeds to block 209 and tests to determine whether the current row is the last row in the image. If so, a message is generated in block 211 that no target was found in the image. If not, the program returns to block 204 to examine the next row. It will be understood that the predefined minimum number of runs is dependent upon the number of concentric rings comprising the target.

If the number of runs is greater than the predefined number, the program examines in turn each white run in the current row. Due to the pattern of this acquisition target, the first two white runs and the last two white runs cannot be the center white run. Therefore, we can limit the search to the white runs which are respectively offset to the first and last white runs of the coded sequence by a certain number, (e.g., 2). At block 206, the first white run is selected. At block 208, the run is tested to determine if it is already at the end of the current row. If so, the program proceeds to block 209 for the test described above. If not, at blocks 212 and 214 the program tests to determine if the white run represents the inner ring 102. For an image of fixed size, the size of the acquisition target can not be arbitrarily big. A certain maximum length (e.g. 6 pixels) can be imposed on the length of the inner white run in order to speed up the locating process. If the white run is longer than this tolerance, tested at block 212, then there is no need to continue testing this run for symmetry, and the program returns to block 206. If the test result shows the white run is within the tolerance, a further test at block 214 is carried out to compare the white run with the proceeding two white runs and the following two white runs. Note that if the three light rings by design have the same width, as is the case in the preferred target shown in FIG. 3, the width of their corresponding runs may differ from each other by one or at most two pixels as a result of the thresholding process or insufficient image resolution.

There are different ways to compare the similarity between the current white run and the neighboring white runs. One similarity test in the preferred embodiment is to see if the center white run plus one pixel is at least as long as each of its four neighboring white runs. It should be clear that this test is not sensitive to any variation in the black/white pixel threshold described above (that is, the choice of the threshold is not critical). If the center white run plus one pixel is shorter than any one of its four neighboring white runs, then it can not be the representative of the inner ring 102, and the program returns to block 206.

If the current run satisfies the test of block 214, at block 218 the following symmetry test is carried out, given an acquisition target 100 formed of 6 concentric rings originally printed with roughly identical width:

(1) Let l be the length of the current white run. Let $w_1$, $w_2$, $w_3$, $w_4$ be the two preceding and two following white runs, and let $b_1$, $b_2$, $b_3$, $b_4$ be the two preceding and two following black runs, of the current row. Denote the average lengths of white runs and black runs respectively by w and b. Then, $$w = \frac{w_1 + w_2 + w_3 + w_4}{4};$$

and $$b = \frac{b_1 + b_2 + b_3 + b_4}{4}.$$

The symmetry test is satisfied if the two following conditions are met:

$|b-w|<2$ $|w_j-w|<2$ and $|b_j-b|<2$ for $j=1,2,3,4$.

where 2 represents the tolerance (2 pixels) allowed for variations in label printer toner and inaccurate image threshold level. Note that the outer dark ring 105 is not used in the test, because its width may sometimes be affected by noisy components (e.g. dark symbology components hexagons in the case of MaxiCode) adjacent to it. If the foregoing first symmetry test is failed, the program returns to block 206.

After passing the symmetry test along axis 300, at block 222 a candidate center coordinate $(x_1, y_1)$ of the acquisition target is declared and the estimated diameter of the entire target along axis 300 (still excluding the outer dark ring 105) is estimated as:

$$d_1 = \sum_{j=1}^{4} w_j + \sum_{j=1}^{4} b_j + l.$$

Based on the candidate center $(x_1, y_1)$, further symmetry tests are carried out at blocks 224 to 232 to verify that the coordinates $(x_1, y_1)$ are within the center of the acquisition target. A new direction for symmetry testing is selected at block 224. Starting from the pixel $(x_1, y_1)$, and using the same threshold as is used in the current horizontal direction, run-length coding both downwardly and upwardly along axis 304 is performed until a total of five "W to B" or "B to W" transitions in each direction are obtained. This results in four white runs and four black runs centered at the candidate center white run. The foregoing symmetry test is applied to these runs at block 226, and the diameter of the acquisition target along this axis is computed and saved at block 228.

It will be understood by those skilled in the art that this diagonal diameter along axis 304, the number of pixels multiplied by a factor of $\sqrt{2}$, should be closely related to the one previously computed along axis 300. The difference between these two diameters is directly proportional to the tilt angle which causes image distortion. A tolerance can be set according to the maximum tilt angle allowed in the imaging process. For example a tolerance of 4 pixels works for tilt angle up to 30 degrees. If the difference is bigger than the selected tolerance, tested at block 230, then the alleged center $(x_1, y_1)$ is discarded and the program returns to block 206 to address a new run, and eventually, if necessary, a new row of data for run-length encoding to repeat the above described tests. Otherwise, the program returns to block 224, and the symmetry test and diameter check will be continued along axes 306 and 302, respectively. Finally, if the vertically encoded data along axis 302, passing through the candidate center $(x_1, y_1)$, pass the symmetry test and the diameter check, the alleged center $(x_1, y_1)$ is confirmed at block 234. In the embodiment shown, any failure will return the program to block 206. However, to allow for distortion or for imperfections in the image of the acquisition target, one failure may be permitted before abandoning the candidate run. For example, failure along one of the diagonal axes may be tolerated if the other diagonal axis and vertical axis pass the symmetry and diameter tests.

It will be understood by those skilled in the art that the candidate center $(x_1, y_1)$ must now lie in the inner light ring 102, yet it may not be in the true center of the acquisition target. A fine-tuning procedure at blocks 236 and 238 is executed based on the starting coordinates $(x_1, y_1)$. FIG. 5 shows the tuning procedure diagrammatically. The coordinates $(x_1, y_1)$ are within the inner ring 102 and assumed to lie at pixel 402. Given $y_1$, a tuning window is defined. The size of the window is defined by the size of the inner white ring 102. The lengths of at least 2 rows of data (the length of the white run) within the inner ring 102 just above and below $y_1$ are counted, such as row $Y_0$, $Y_2$ and $y_3$. Numerical values representing the corresponding lengths are then obtained, for example the length of row $Y_0$ may be 5 pixels and the length of row $y_2$ may be 7 pixels. The new vertical coordinate is chosen in the longest row, that is, in the row measuring the greatest width of the inner ring 102. This establishes a new candidate center 404 (which in the example shown is at coordinates $(x_1, y_2)$).

Then, the same type of measurement is again performed along the columns based on the coordinates $(x_1, y_2)$, to find the longest column within the inner ring 102 (which turns out to be $x_2$ in the example shown in FIG. 5). The intersection of the longest row and the longest column, at coordinates $(x_2, y_2)$, are the final or true center coordinates of the acquisition target.

When there are two or more column or row length values that happen to be the same, at block 238 of FIG. 4 the pixel intensity values for each of the equal rows or columns are accumulated. The final center coordinate in such a case is selected to be in the row or column having the largest summed intensity value.

Having found the center of the acquisition target, further procedures may go forward, depending on the purpose of the target. In the case of an optically encoded symbology, the orientation of the symbology, location of data encoding elements, and decoding of the encoded information may depend on first locating the acquisition target. In a robotic system, a robotic tool may be moved to a location determined by the center of the acquisition target. Location of a target may confirm the presence of a certain item in tracking systems and other automation lines.

It should be understood that the method and system of the present invention is not limited to the type of acquisition target found in the MaxiCode symbology, which has been used only as an example. When the invention is applied to bull's-eye type targets, the rings need not be complete in the image, so long as sufficient symmetry information can be obtained. If a full diameter with a horizontal run is not present, the processor may be programmed to check many scanning directions through the image to find an initial row through the center of the target using the method described above. Furthermore, the target need not have the number of rings shown in the drawings. The present invention can be applied to a target having a key element and a single bordering element surrounding the key element. In the preferred embodiment shown, this would be the inner ring 102 and the next adjacent dark ring 101.

The present invention can also be applied to non-circular acquisition targets having at least two degrees of symmetry. Again in this case, the processor must be programmed to check many scanning directions through the image to find an initial row through the center of the target using the method described above. Then a second scanning direction must be found using the above techniques along which the target image displays symmetry. However, the technique of the present invention is more efficient and more accurate if the target is symmetrical along the x axis of the stored image.

Although the present invention has an important use in locating the acquisition target embedded in a two-dimensional symbology as disclosed by U.S. Pat. Nos. 4,874,936 and 4,896,029, those skilled in the art will understand that the present invention may be implemented in systems other than those for locating optically encoded symbols. As noted, the present invention may be implemented for automatic tracking in robotic systems and other automation lines.

It will further be understood that various changes in the details, materials, and arrangements of the parts and parameters which have been described and illustrated to explain the nature of the invention may be made by those skilled in the art without departing from the principle and scope of the invention as expressed in the following claims.

What is claimed is:

1. A method of locating an optically readable, two-dimensional acquisition target in a stored image, said target being of the type having a key element, said key element being a geometrically symmetric, bounded element of a first reflectivity surrounded by a geometrically symmetric key border area of a second reflectivity, comprising the steps of:

scanning said stored image along a scanning direction and detecting a candidate bounded element and associated border area demonstrating symmetry along said scanning direction; and determining whether said candidate bounded element and associated border area are symmetric along a second direction.

2. The method of claim 1, wherein said key border area comprises a plurality of symmetric rings of alternating first and second reflectivity surrounding said key element; and further comprising the steps of:

finding a center point of said candidate bounded element;

determining whether said candidate bounded element and said associated border area are symmetric along at least one of a pair of diagonal directions passing through said center point;

determining whether said candidate bounded element and said associated border area are symmetric along a vertical direction normal to said scanning direction;

determining diameters of said candidate bounded element and said associated border area in each of said directions in which they exhibit symmetry; and determining whether said diameters are within a predetermined tolerance of each other.

3. The method of claim 2, wherein said steps of determining whether said candidate bounded element and said associated border area are symmetric comprise determining whether the width of said bounded element is at least as long as the widths of each of said border area rings of alternating reflectivity on both sides of said bounded element.

4. The method of claim 3, wherein said steps of determining whether said candidate bounded element and said associated border area are symmetric further comprise the steps of:

determining whether the absolute value of the difference between a first average width of the rings of the first reflectivity on both sides of said bounded element and a second average width of the rings of the second reflectivity on both sides of said bounded element is less than a preset tolerance;

determining whether the difference between the first average width of the rings of the first reflectivity on both sides of said bounded element and the individual components of said first average is less than said preset tolerance; and determining whether the difference between the second average width of the rings of the second reflectivity on both sides of said bounded element and the individual components of said second average is less than said preset tolerance.

5. The method of claim 4, further comprising the steps of finding a pair of longest orthogonal cords within said bounded element and assigning a center point of said bounded element at the intersection of said cords.

6. A system for locating an optically readable, two-dimensional acquisition target in a stored image of a symbology in which alphanumeric data is encoded, said target being of the type having a key element, said key element being a geometrically symmetric, bounded element of a first reflectivity surrounded by a geometrically symmetric key border area of a second reflectivity, comprising:

a light source;

a detector comprising an array of pixels positioned to receive light from said light source reflected by said target;

a read-out circuit connected to obtain data signals from said pixels and to form in a memory device an image including said target; and a processor configured to locate said key element by:
scanning said stored image along a scanning direction to detect a candidate bounded element demonstrating symmetry along said scanning direction; and
determining whether said candidate bounded element is symmetric along a second direction.

7. The system of claim 6, wherein said key border area comprises a plurality of symmetric rings of alternating first and second reflectivity surrounding said key element; and wherein said processor is further configured to:

find a center point of said candidate bounded element;

determine whether said candidate bounded element and said associated border area are symmetric along at least one of a pair of diagonal directions passing through said center point;

determine whether said candidate bounded element and said associated border area are symmetric along a vertical direction normal to said scanning direction;

determine diameters of said candidate bounded element and said associated border area in each of said directions in which they exhibit symmetry; and determine whether said diameters are within a predetermined tolerance of each other.

8. The system of claim 7, wherein said processor is further configured to determine whether the width of said bounded element is at least as long as the widths of each of said border area rings of alternating reflectivity on both sides of said bounded element.

9. The system of claim 8, wherein said processor is further configured to:

determine whether the absolute value of the difference between a first average width of the rings of the first reflectivity on both sides of said bounded element and a second average width of the rings of the second reflectivity on both sides of said bounded element is less than a preset tolerance;

determine whether the difference between the first average width of the rings of the first reflectivity on both sides of said bounded element and the individual components of said first average is less than said preset tolerance; and determine whether the difference between the second average width of the rings of the second reflectivity on both sides of said bounded element and the individual components of said second average is less than said preset tolerance.

10. The system of claim 9, wherein said processor is further configured to find a pair of longest orthogonal cords within said bounded element and assign a center point of said bounded element at the intersection of said cords.

11. The system of claim 6, wherein said processor is configured to scan said stored image along a scanning direction for non-character information, and to detect a candidate bounded element demonstrating symmetry along said scanning direction using said non-character information.

12. A method of locating an optically readable, two-dimensional symbology of the type having a key element, said key element being a geometrically symmetric, bounded element of a first reflectivity surrounded by a geometrically symmetric key border area of a second reflectivity, comprising the steps of:

deriving a multiple-row image including said symbology from a pixel matrix and storing said image; and locating said key element by:
scanning said stored image along a scanning direction and detecting a candidate bounded element and associated border area demonstrating symmetry along said scanning direction; and
determining whether said candidate bounded element and associated border area are symmetric along a second direction.

13. The method of claim 12, wherein said step of detecting a candidate bounded element and associated border area demonstrating symmetry along said scanning direction comprises run-length coding the rows of said image for the first reflectivity, and examining said runs for symmetry.

14. The method of claim 12, wherein said symbology comprises a plurality of polygonal information encoding elements arranged in a matrix.

15. A system for locating an optically readable, two dimensional symbology of the type having a key element, said key element being a geometrically symmetric, bounded element of a first reflectivity completely surrounded by a geometrically symmetric key border area of a second reflectivity, comprising:

a light source;

a detector comprising an array of pixels positioned to receive light from said light source reflected by said symbology;

a read-out circuit connected to obtain data signals from said pixels and to form in a memory device an image including said symbology; and a processor configured to locate said key element by:
scanning said stored image along a scanning direction to detect a candidate bounded element and associated border area demonstrating symmetry along said scanning direction; and
determining whether said candidate bounded element and associated border area are symmetric along a second direction.

16. The system of claim 15, wherein said symbology comprises a plurality of polygonal information encoding elements arranged in a matrix.

17. A method of locating an optically readable, two-dimensional acquisition target in a stored image, said target being of the type having a key element, said key element being a geometrically symmetric, bounded element of a first reflectivity surrounded by a geometrically symmetric key border area of a second reflectivity, comprising the steps of:
scanning said stored image along a scanning direction and detecting a candidate bounded element and associated border area demonstrating symmetry along said scanning direction;
determining whether said candidate bounded element and said associated border area are symmetric along a second direction;
determining diameters of said candidate bounded element and said associated border area in said scanning direction and said second direction; and
determining whether said diameters are within a predetermined tolerance of each other.

18. The method of claim 17, further comprising the steps of averaging said diameters and determining the size of said target based on said average diameter.

19. A system for locating an optically readable, two-dimensional acquisition target in a stored image, said target being of the type having a key element, said key element being a geometrically symmetric, bounded element of a first reflectivity surrounded by a geometrically symmetric key border area of a second reflectivity, comprising:
a light source;
a detector comprising an array of pixels positioned to receive light from said light source reflected by said target;
a read-out circuit connected to obtain data signals from said pixels and to form in a memory device an image including said target; and
a processor configured to locate said key element by:
scanning said stored image along a scanning direction to detect a candidate bounded element demonstrating symmetry along said scanning direction;
determining whether said candidate bounded element is symmetric along a second direction;
determining diameters of said candidate bounded element in said scanning direction and said second direction; and
determining whether said diameters are within a predetermined tolerance of each other.

20. The system of claim 19, wherein said processor is further configured to average said diameters and determine the size of said target based on said average diameter.

21. A method of locating an optically readable, two-dimensional acquisition target in a stored image, said target being of the type having a key element, said key element being a geometrically symmetric, bounded element of a first reflectivity surrounded by a geometrically symmetric key border area of a second reflectivity, comprising the steps of:
scanning said stored image along a scanning direction;
run-length coding said image in said scanning direction;
detecting a candidate bounded element and associated border area demonstrating symmetry along said scanning direction by examining said runs for symmetry; and
determining whether said candidate bounded element and said associated border area are symmetric along a second direction.

22. A system for locating an optically readable, two-dimensional acquisition target in a stored image, said target being of the type having a key element, said key element being a geometrically symmetric, bounded element of a first reflectivity surrounded by a geometrically symmetric key border area of a second reflectivity, comprising:
a light source;
a detector comprising an array of pixels positioned to receive light from said light source reflected by said target;
a read-out circuit connected to obtain data signals from said pixels and to form in a memory device an image including said target; and
a processor configured to locate said key element by:
scanning said stored image along a scanning direction;
run-length coding said image in said scanning direction;
detecting a candidate bounded element demonstrating symmetry along said scanning direction by examining said runs for symmetry; and
determining whether said candidate bounded element is symmetric along a second direction.

23. A method of locating an optically readable, two-dimensional symbology of the type having a key element, said key element being a geometrically symmetric, bounded element of a first reflectivity surrounded by a geometrically symmetric key border area of a second reflectivity, comprising the steps of:
deriving an image including said symbology from a pixel matrix and storing said image; and
locating said key element by:
scanning said stored image along a scanning direction;
run-length coding said image in said scanning direction;
detecting a candidate bounded element and associated border area demonstrating symmetry along said scanning direction by examining said runs for symmetry; and
determining whether said candidate bounded element and said associated border area are symmetric along a second direction.

24. The method of claim 23, further comprising the step of determining whether said candidate bounded element and associated border area are symmetric along a third direction normal to said scanning direction.

25. The method of claim 23, further comprising the strip of finding a pair of longest orthogonal cords within said bounded element to locate a center of said element.

26. The method of claim 23, wherein said key border area comprises a plurality of symmetric rings of alternating first and second reflectivity surrounding said key element; and wherein said step of locating said key element further comprises:
finding a center point of said candidate bounded element;
determining whether said candidate bounded element and said associated border area are symmetric along at least one of a pair of diagonal directions passing through said center point;

determining whether said candidate bounded element and said associated border area are symmetric along a vertical direction normal to said scanning direction;

determining diameters of said candidate bounded element and said associated border area in each of said directions in which they exhibit symmetry; and determining whether said diameters are within a predetermined tolerance of each other.

27. The method of claim 26, further comprising the steps of averaging said diameters and determining the size of said symbology based on said average diameter.

28. The method of claim 26, wherein said steps of determining whether said candidate bounded element and said associated border area are symmetric comprises the step of determining whether the width of said bounded element is at least as long as the widths of each of said border area rings of alternating reflectivity on both sides of said bounded element.

29. The method of claim 28, wherein said steps of determining whether said candidate bounded element and said associated border area are symmetric further comprises the steps of:

determining whether the absolute value of the difference between a first average width of the rings of the first reflectivity on both sides of said bounded element and a second average width of the rings of the second reflectivity on both sides of said bounded element is less than a preset tolerance;

determining whether the difference between the first average width of the rings of the first reflectivity on both sides of said bounded element and the individual components of said first average is less than said preset tolerance; and determining whether the difference between the second average width of the rings of the second reflectivity on both sides of said bounded element and the individual components of said second average is less than said preset tolerance.

* * * * *